July 18, 1933.  S. P. MILLER  1,918,283
RECOVERY OF TAR ACIDS
Filed April 24, 1930    2 Sheets-Sheet 1
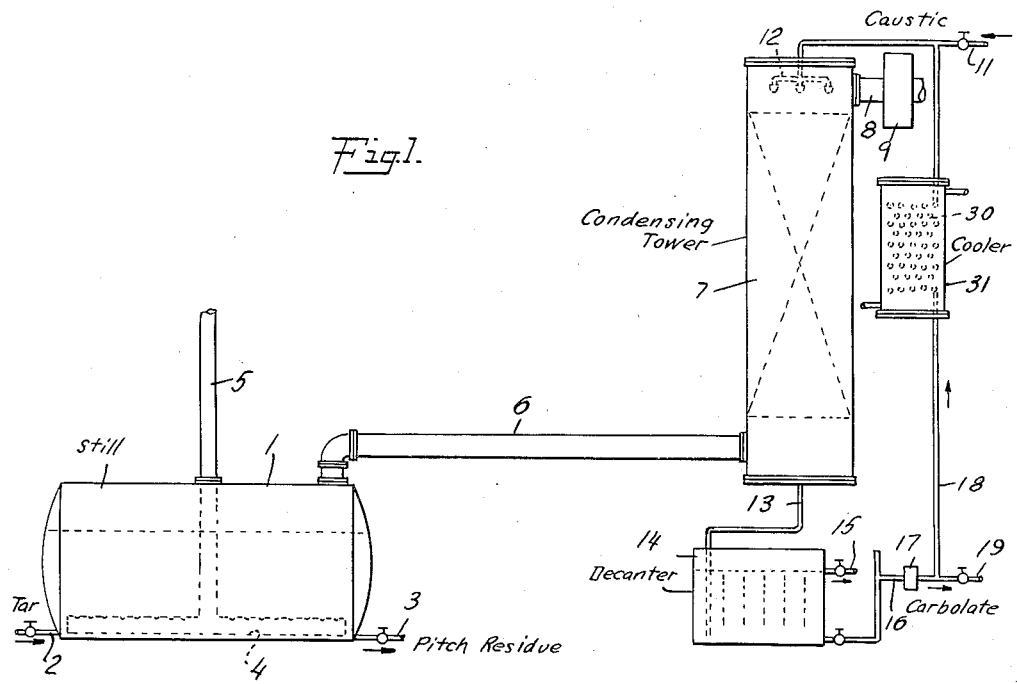
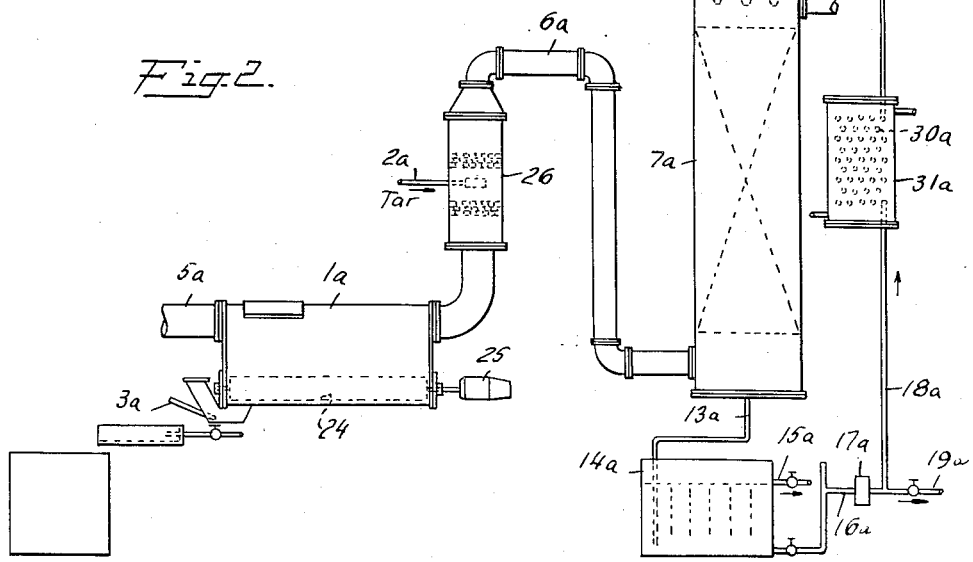
INVENTOR
S. P. Miller
BY
Pennie Davis Marvin & Edmonds
ATTORNEYS July 18, 1933.                   S. P. MILLER                    1,918,283
                              RECOVERY OF TAR ACIDS
                    Filed April 24, 1930        2 Sheets-Sheet 2
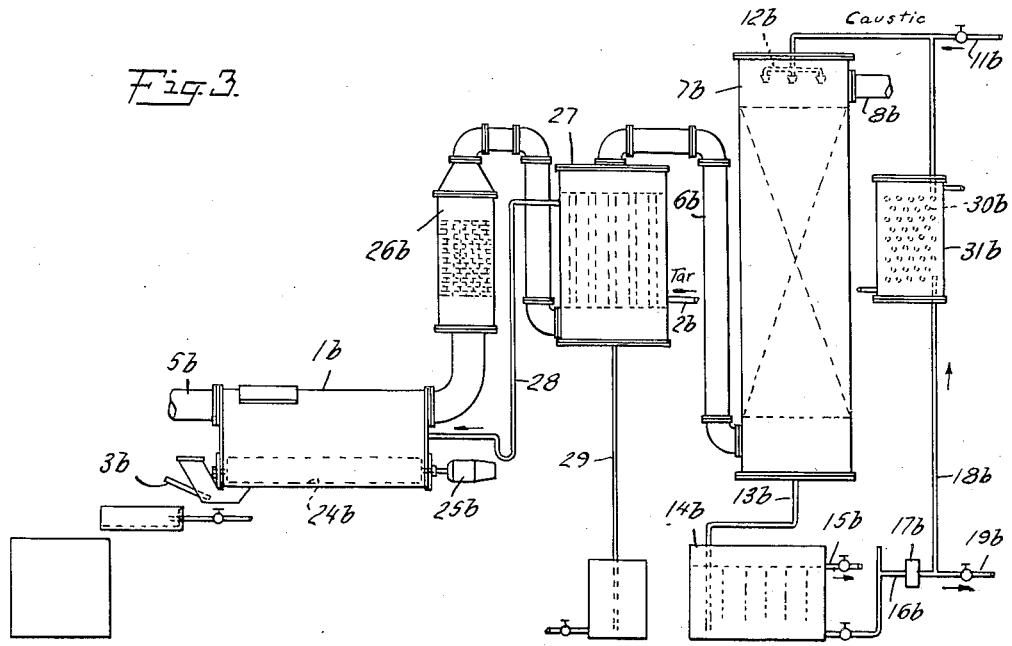
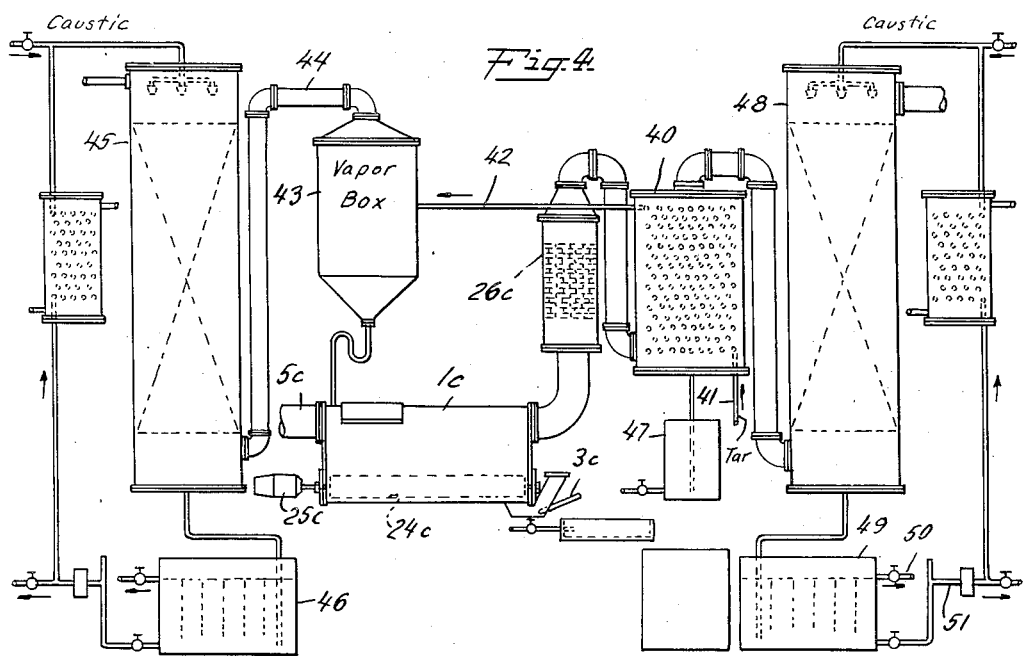
INVENTOR
S. P. Miller
BY
Pennie Davis Marvin & Edmonds
ATTORNEYS Patented July 18, 1933

1,918,283

UNITED STATES PATENT OFFICE

STUART PARMELEE MILLER, OF ENGLEWOOD, NEW JERSEY, ASSIGNOR TO THE BARRETT COMPANY, OF NEW YORK, N. Y., A CORPORATION OF NEW JERSEY

RECOVERY OF TAR ACIDS

Application filed April 24, 1930. Serial No. 446,868.

This invention relates to an improved process for the distillation of tar containing tar acids and the simultaneous production of neutral oils and extraction of tar acids.

According to the present invention, tar is subjected to distillation with the aid of a hot inert gas to effect distillation of tar acid oils, and the resulting oil vapors and inert gases are subjected to total condensation and simultaneous extraction of tar acids by bringing the admixed gases and vapors into intimate contact with caustic solution as the direct contact condensing agent, thereby producing directly an extracted neutral oil and simultaneously producing a carbolate solution containing the tar acids combined with the caustic solution.

The inert gases which are employed in the distillation process of the present invention are gases which do not react to any objectionable extent with the caustic solution. Among the inert gases which may be used are nitrogen or air, steam, superheated steam, hydrocarbon gases such as natural gas, etc., or gases such as illuminating gas, or even coke oven or other coal distillation or gasification gas which has been freed from any objectionable content of impurities such as hydrogen sulfide, hydro-cyanic acid, carbon dioxide, etc. When exhaust steam or other inert gas containing waste heat is available it may be used for the distillation, to advantage.

The caustic solution is preferably a caustic soda solution, though other solutions yielding soluble carbolates, such as caustic potash, may be used.

The distillation of the tar may be so carried out that the inert gases, in a highly heated state, supply all the heat necessary for the distillation of the tar, or the tar can be preheated to some extent or heat may be applied to the still during the distillation to aid in the distillation. The process is of particular importance where the entire heating of the tar is effected by hot or preheated inert gases which are brought into intimate contact with the tar at a high temperature and effect rapid distillation thereof.

The distillation of the tar can be carried out in apparatus of different kinds. For example, an apparatus which atomizes or sprays the tar or pitch into the hot gases may be used effectively for the distillation of the tar.

The mixture of oil vapors and inert gases resulting from the distillation is passed to a total condenser where the admixed gases and vapors are brought into direct contact with a sufficiently large amount of caustic or caustic-carbolate solution, in a sufficiently intimate state of sub-division and at a sufficiently low temperature, to rapidly cool the admixed gases and vapors sufficiently to effect substantially complete condensation of oil vapors. The caustic solution is preferably recirculated and cooled during recirculation, to maintain it at a sufficiently low temperature and effect the requisite heat absorption from the vapors. Fresh caustic may be added and carbolate withdrawn continuously during recirculation, or the addition and withdrawal may be effected batchwise.

The caustic solution used for the condensation extracts the tar acid constituents of the oil vapors simultaneously with the condensation, so that the tar acids are combined with the caustic solution as carbolates. Where the caustic solution is recirculated and additions and removals are effected batchwise, a large excess of the alkaline absorbing agent over tar acids is at first present. This is gradually converted to sodium salts of tar acids and the cooling solution progressively increases in carbolate content until the carbolate concentration reaches the desired point, after which the solution can be withdrawn and a fresh solution added.

When fresh caustic is added and carbolate withdrawn continuously, the carbolate may be recirculated through cooling coils to the condenser after separation from the condensed neutral oils in a decanter, or a mixture of carbolate and neutral oils may be recirculated, and the separation of condensed oils effected only in the portion continuously drawn off.

The hot inert gases, either with their natural heat or after being heated, can be brought into intimate contact with the tar to be distilled, and the resulting gases, after the condensation of oils therefrom, may then be passed to a place of storage or use, or they may be exhausted to the atmosphere when they are of no value. The total condensation will remove from the gases all constituents, which are condensable at the temperatures ordinarily obtainable by water cooling. Lighter oil vapors, if present, may remain with the inert gases. These vapors may be removed from the gases by scrubbing, or where these gases are fuel gases, they will be enriched by the light oil vapor constituents.

Where the distillation is carried out as a batch operation, with distillation first of lower boiling oil constituents, and subsequently of higher boiling oils, the condensation and simultaneous extraction can be carried out in stages, withdrawing the caustic solution employed for condensing lower boiling oils and using a fresh caustic solution for condensing and simultaneously extracting the higher boiling oils. Or the higher boiling oils may be condensed by the use of water or ammonia liquor without effecting substantial tar acid extraction.

Where the distillation is carried out continuously with the simultaneous vaporization of both low and high boiling point constituents from the tar, the admixed inert gases and vapors can be first partly cooled to condense higher boiling constituents therefrom without simultaneous extraction, and the remaining admixed gases and vapors can then be subjected to simultaneous condensation and extraction with the use of a caustic solution as the direct condensing agent, used in sufficient amount for effecting the desired total condensation and extraction. When there is any appreciable amount of moisture in the gases as when the tar is being both dehydrated and distilled, the concentration of caustic in the condensing agent as it is supplied to the condensing system may be made sufficient to compensate for the water which is condensed and separated from the gases.

Tar acids of low boiling range and also neutral oils, etc. may be distilled or "stripped" from the tar before it is brought into contact with the hot inert gas, and this distillate may be separately condensed by caustic solution or in any other suitable manner without dilution with inert gases, the presence of which would lower the dewpoint of the distillate and thus increase distillation losses. The stripped tar may then be distilled by direct contact with inert gases to distill off the balance of the tar acid oils, the vapors of which, because of their higher boiling range, can more readily be separated from admixture with the inert gases. The tar can be thus stripped by indirect heat interchange with the hot inert gases and vapors coming from the tar still, or in any other suitable manner.

Tarry oils, such as those recovered from the coolers of coal distillation plants, also contain tar acid oils, as do tar distillates, and such oils and distillates may be treated by the process of this invention to recover neutral oils and carbolate. The word "tar" is used herein to include such tar products.

The invention will be further described in connection with the accompanying drawings which are of a more or less conventional and diagrammatic character.

In the accompanying drawings

Fig. 1 shows an arrangement of apparatus in which hot inert gas is employed for the tar distillation and caustic soda is used for total condensation and simultaneous extraction of the tar acids;

Fig. 2 shows a modified arrangement in which the tar is sprayed up into the gases;

Fig. 3 shows a further modification in which the total condenser is preceded by a preliminary condenser for the higher boiling oils; and Fig. 4 shows a further modification in which lower boiling tar acids are volatilized in a preliminary distillation.

In the apparatus of Fig. 1, a still 1, which may be externally heated or which may be heated only by hot inert gases, is provided with valve controlled inlet 2 and outlet 3 for the introduction of tar and the discharge of pitch residue, either continuously or batchwise. The still is provided with a perforated pipe 4 in its bottom through which the inert gas is introduced, this gas being supplied through the pipe 5 and being caused to bubble up in intimate contact with the tar to effect heating and agitation and the distillation thereof. The outlet for the admixed inert gases and vapors is shown as a pipe 6 leading to the condensing tower 7 from which the inert gases pass through the line 8 to an exhauster 9, thence to storage or for other disposal.

The condenser 7 is shown as a packed tower with introduction of the gases and vapors at the bottom and escape of the gases at the top. A caustic solution is supplied through suitable distributing devices 12 at the top of the tower to insure uniform distribution of the caustic. The carbolate solution and the condensed oil are drawn off from the bottom of the condenser through the line 13 into the decanter or separating chamber 14 where, according to the arrangement shown, separation of the heavier carbolate solution from the lighter oil takes place. The oil is drawn off through the outlet 15. The carbolate solution, containing any excess caustic which has not been saturated with tar acids, is drawn off through the line 16 to the pump 17 and pumped through the line 18 and the cooling coil 30 back to the top of the tower. Fresh caustic can be supplied continuously through the line 11 and part of the carbolate solution can be withdrawn continuously through the line 19. The cooling coil 30 is located in a suitable cooling tank 31 cooled, for example, by cold water.

If caustic is added and carbolate removed batchwise, the carbolate solution recirculated from decanter 14 through pipe 18 to distributor 12 will contain a gradually diminishing excess of caustic until it is saturated with tar acids and ready for withdrawal.

In the operation of the apparatus, the still 1 is charged with tar, either continuously or batch-wise, and the pitch produced is similarly withdrawn. Hot inert gas, such as waste steam or heated nitrogen, etc. is forced through the perforated pipe in the bottom of the still to effect heating and distillation of the tar. This heating may be supplemented by external heating, or the hot gases may be used as the sole heating means for heating and distilling the tar. The admixed inert gases and vapors leaving the still pass to the total condenser 7 where they are brought into intimate contact with the cooling and condensing and extracting caustic liquid flowing downwardly therethrough. This caustic liquid may, for example, be a 7–8% sodium hydroxide solution, or it may be a 30% sodium hydroxide solution, depending on the concentration of carbolate desired. It may be recirculated through the cooling coils and condenser to substantially complete saturation with tar acids, the heat absorption from the system being effected in the cooling coils. A 7–8% caustic solution will yield a carbolate solution containing, for example, from 15 to 20% or more tar acids, depending on the amount of evaporation taking place in the condenser. As a result, the oil vapors are condensed, the tar acids are combined with the caustic, the mixture of carbolate solution and neutral oil is drawn off into the decanter or separating chamber 14 and permitted to separate into layers, and the caustic liquor is then recirculated to the desired extent or drawn off when it has reached the proper concentration.

By using, with or without recirculation and outside cooling, a sufficiently large amount of the caustic or caustic-carbolate solution at a sufficiently low temperature, it serves as a direct condensing agent for condensing all or practically all of the oil vapors, and the tar acids are simultaneously extracted and combined with the caustic during the condensation. As a result, the oils condensed are recovered directly as neutral oils, and the extraction of tar acids is combined with the condensation so that no separate treatment of the condensed oils for the extraction of tar acids is necessary.

In each of Figs. 1, 2, 3 and 4, parts the same as or corresponding to similar parts in other figures are indicated by the same reference numerals, with letters $a$, $b$ and $c$, respectively, appended to the parts shown in Figs. 2, 3 and 4.

In Fig. 2 the still $1a$ is a chamber having a rapidly rotatable spray roll 24 therein shown as driven by the electric motor 25 and arranged to dip into the tar or pitch in the bottom of the chamber and to spray or atomize the same into the gases in the upper part of the chamber. The inlet for the hot inert gases is indicated at $5a$ and these gases may come from any suitable source such as a preheater, or a supply of hot inert gases directly from a source of production. A settling chamber 26 is arranged above the still $1a$ and the supply of tar to be distilled is shown as entering through the line $2a$ into the upper portion of the settling chamber 26. The chamber 26 is provided with baffles or filling material to insure separation of entrained particles from the gases and intimate contact of the tar with the gases and vapors to preheat the tar before it enters the still. From the top of the settling chamber 26 the gases and vapors pass through the line $6a$ to the direct condenser $7a$ which is operated in a manner similar to that above described in connection with Fig. 1.

The still of Fig. 3 is similar to that of Fig. 2 but has a preliminary condenser 27 located between the settling chamber $26b$ and the total condenser $7b$. The tar is supplied through the line $2b$ to the indirect condenser 27 where it is preheated by indirect contact with the hot gases and vapors, with simultaneous cooling of the gases and vapors and condensation of heavier oil constituents therefrom. The preheated tar then passes through the line 28 to the still $1b$ while the inert gases and vapors pass from this preliminary condenser 27 through the line $6b$ to the total condenser $7b$ where the gases and vapors are cooled to a low temperature to effect substantially complete condensation of oils therefrom and simultaneous extraction of tar acids. The heavier oils condensed in the indirect condenser 27 are drawn off through the line 29. This arrangement makes possible the simultaneous distillation of higher and lower boiling oil constituents from coal tar, with preliminary cooling and condensation of higher boiling oil constituents, leaving the lighter boiling oils, such as those containing the lower boiling point tar acids, in vapor state to be subsequently condensed and simultaneously extracted, thus giving a lighter neutral oil and a carbolate solution containing a larger proportion of lower boiling tar acids.

If only a carbolic oil fraction, or a tar acid oil fraction containing lower boiling tar acids, is desired from the tar, the process can be operated to effect distillation of such fractions, leaving a low melting point pitch residue which may be drawn off as a product of the process or subjected to further distillation. Where the tar is distilled to produce higher boiling point oils simultaneously with the lower boiling oils, the total distillate can be condensed and simultaneously extracted, or the heavier oils can be first condensed and the remaining oils then subjected to total condensation and simultaneous extraction of tar acids, for example, in an arrangement such as shown in Fig. 3.

The apparatus indicated in Fig. 4 shows a still 1c similar to the still shown in Figs. 2 and 3 for the distillation of tar by spraying the tar into the hot gases, but the tar in this instance is stripped tar from which lower boiling tar acids and oils, etc. have been distilled. The stripping takes place in the heat interchanger 40 and vapor box 43. The tar enters the heat interchanger through pipe 41. It is heated as it passes through the heat interchanger and the heated tar is then flashed in the vapor box 43, and the low boiling distillate, including tar acids, is separately condensed in the condenser 45 which is connected to the vapor box by the pipe 44.

Any suitable type of condenser may be employed for condensing the vapors which separate from the tar residue in the vapor box. The vapors may be condensed by indirect contact with a cooling medium or a direct contact condenser may be employed. In the drawings the condenser shown at 45 is a direct condenser and caustic is employed as the condensing medium. The caustic condenses the vapors and simultaneously extracts the tar acids. The carbolate is separated from the neutral oils in the decanter 46. A portion of the carbolate-containing liquor drawn from the bottom of the condenser may be recirculated and cooled and blended with fresh caustic for further use.

The distillation residue in the vapor box 43 is drawn off to the still 1c where it is atomized into the hot gases which enter through 5c and further distilled. Further distillation of this stripped tar in the still 1c may be effected with either concurrent or countercurrent flow of the tar and gases through the still. The pitch produced is drawn off at 3c. Baffles 26c are provided to remove entrained particles of tar spray from the gases and vapors before they enter the heat interchanger.

In the heat interchanger higher boiling oils are condensed from the gases. Where the pitch produced in the still 1c is a pitch of high melting point, higher boiling oils such as oils of the creosote range or higher and substantially free from tar acids, or at least the more desirable low boiling tar acids, may be condensed in the heat interchanger 40. These oils are collected in the tank 47. The tar acids and particularly the tar acids of lower boiling range are carried over by the gases from the heat interchanger 40 to the condenser 48 where total condensation and extraction are effected. In this condenser the gases and vapors are sprayed with a solution of caustic and the tar acids are condensed and separated from the gases and they are simultaneously extracted from neutral oils which are also condensed and separated from the gases. The carbolate and neutral oils are drawn off into the decanter 49. The neutral oils produced are separately drawn off from the decanter through the line 50. The carbolate is drawn off through the line 51. A portion of the liquor drawn off through the line 51 may be recirculated through the condenser, as described in connection with the preceding drawings.

Hot gases can be employed for the distillation at temperatures up to 500 or 600° C., but gases can also be employed at a much lower temperature. The use of a larger volume of gases at a lower temperature is effective for carrying out the process. Where gases are available at a higher temperature, a smaller volume can be employed.

The pitch produced by the process can be drawn off either continuously or batch-wise, depending upon the manner in which the distillation is carried out, and on the equipment used. Pitches of varying melting points can be produced, including low melting point pitches from which only the lower boiling tar acid oils have been distilled, or higher melting point pitches from which a much larger proportion of the total oils have been distilled.

The carbolate solution produced may also vary in its concentration and in the amounts and proportions of the different tar acids which it contains. It can be readily treated to free the tar acids or phenols from their combination with alkali, for example, by carbonating with carbon dioxide to form sodium carbonate and to set free the phenols. The carbonate solution can be recausticized for further use in the process.

I claim:—

1. The method of producing neutral oils and tar acids from tar, which comprises subjecting the tar to distillation at an elevated temperature with the aid of an inert gas brought into intimate contact with the tar to produce a mixture of hot inert gases and tar acid oil vapors, and subjecting such gases and vapors to condensation and simultaneous extraction of tar acids by bringing caustic solution into direct contact therewith to effect substantially complete condensation of oil vapors from the gases and simultaneous extraction of tar acids, and separating the resulting condensed neutral oils from the carbolate solution.

2. The method of producing neutral oils and tar acids from tar, which comprises subjecting tar to distillation by heating the same with hot inert gases as the main or only heating means, such gases being brought into direct and intimate contact with the tar to produce a mixture of inert gases and tar acid oil vapors, drawing off the mixed gases and vapors and bringing the same into contact with a caustic solution in sufficient amount, at sufficiently low temperature and with sufficient intimacy to effect substantially complete condensation of oil vapors from the gases and simultaneous extraction of tar acids therefrom, and separating the resulting neutral oils from the carbolate solution.

3. The method of producing neutral oils and tar acids from tar, which comprises supplying hot inert gases continuously and bringing them into direct and intimate contact with tar to effect distillation of the tar, drawing off the resulting inert gases and oil vapors and cooling the same by direct contact with a caustic solution used in sufficient amount, at a sufficiently low temperature and with sufficiently intimate contact to effect rapid and substantially complete condensation of oils and simultaneous extraction of tar acids, and separating the resulting neutral oils from the carbolate solution produced.

4. The process according to claim 1 in which the hot gases and vapors are subjected to preliminary cooling to condense higher boiling point oils therefrom before subjecting them to the total condensation by direct contact with the caustic solution.

5. The process according to claim 2 in which the hot gases and vapors are subjected to preliminary cooling to condense higher boiling point oils therefrom before subjecting them to the total condensation by direct contact with the caustic solution.

6. The method of producing neutral oils and tar acids from tar, which comprises subjecting the tar to distillation with the aid of a hot inert gas brought into intimate contact with the tar to produce a mixture of hot inert gases and tar acid oil vapors, subjecting such gases and vapors to condensation and simultaneous extraction of tar acids by bringing into direct contact therewith caustic solution in sufficient amount and at a sufficiently low temperature to effect substantially complete condensation of oil vapors from the gases and in excess of the amount required for simultaneous extraction of tar acids, separating the resulting condensed neutral oils from the partially saturated carbolate solution, cooling the carbolate solution thus obtained, and recirculating the carbolate solution through the zones of condensation, separation and cooling until it is substantially saturated with tar acids.

7. The method of producing neutral oils and tar acids from tar, which comprises subjecting the tar to distillation with the aid of a hot inert gas brought into intimate contact with the tar to produce a mixture of hot inert gases and tar acid oil vapors, subjecting such gases and vapors to condensation and simultaneous extraction of tar acids by bringing into direct contact therewith caustic solution in sufficient amount and at a sufficiently low temperature to effect substantially complete condensation of oil vapors from the gases and simultaneous extraction of tar acids, separating the resulting condensed neutral oils from the carbolate solution, cooling at least a portion of the carbolate solution thus obtained, mixing fresh caustic therewith and employing the solution thus obtained for further condensation and simultaneous extraction of tar acids from admixture with inert gases.

8. The method of producing neutral oils and tar acids from tar, which comprises subjecting tar to distillation by heating the same with inert gases as the main or only heating means, such gases being brought into direct and intimate contact with the tar to produce a mixture of inert gases and tar acid oil vapors, drawing off the admixed gases and vapors and bringing the same into contact with a caustic solution in sufficient amount, at a sufficiently low temperature, and with sufficient intimacy to effect substantially complete condensation of oil vapors from the gases, separating the resulting neutral oils from the carbolate solution obtained, cooling at least a portion of the carbolate solution and adding fresh caustic thereto and using the resulting caustic-carbolate solution for further condensation and simultaneous extraction of tar acid oil vapors from admixture with inert gases.

9. The method of producing neutral oils and tar acids from tar, which comprises subjecting tar to partial distillation to distill low boiling constituents therefrom, subjecting the residue from such distillation to further distillation with the aid of a hot inert gas brought into intimate contact therewith to produce a mixture of hot inert gases and tar acid oil vapors, subjecting such gases and vapors to condensation and simultaneous extraction of tar acids by bringing into direct contact therewith caustic solution in sufficient amount and at a sufficiently low temperature to effect substantially complete condensation of oil vapors from the gases and simultaneous extraction of tar acids, and separating the resulting condensed neutral oils from the carbolate solution obtained.

10. The method of producing pitch, neutral oils and tar acids from tar, which comprises further distilling partially distilled tar by direct contact with hot inert gases to produce a high melting point pitch, partially cooling the gases and vapors resulting from this distillation by bringing them into indirect heat interchanging relation with fresh tar thereby heating and partially distilling the tar and condensing oils of high boiling range from the mixture of gases and vapors, bringing the partially cooled mixture of gases and vapors into direct contact with caustic solution in sufficient amount and at a sufficiently low temperature to effect simultaneous total condensation of oil vapors and extraction of tar acids therefrom, and separating the resulting neutral oils from the carbolate obtained.

S. P. MILLER.